(12) United States Patent
Lehti

(10) Patent No.: US 11,661,119 B2
(45) Date of Patent: May 30, 2023

(54) TAILGATE FOR VEHICLE WITH INTEGRATED COLLAPSIBLE DOOR

(71) Applicant: Multimatic Inc., Markham (CA)

(72) Inventor: Michael Gordon Lehti, Markham (CA)

(73) Assignee: Multimatic Inc., Markham (CA)

( * ) Notice: Subject to any disclaimer, the term of this patent is extended or adjusted under 35 U.S.C. 154(b) by 0 days.

(21) Appl. No.: 17/796,052

(22) PCT Filed: Feb. 17, 2021

(86) PCT No.: PCT/CA2021/050167
§ 371 (c)(1),
(2) Date: Jul. 28, 2022

(87) PCT Pub. No.: WO2021/163789
PCT Pub. Date: Aug. 26, 2021

(65) Prior Publication Data
US 2023/0070773 A1 Mar. 9, 2023

Related U.S. Application Data

(60) Provisional application No. 62/978,105, filed on Feb. 18, 2020.

(51) Int. Cl.
*B62D 33/027* (2006.01)

(52) U.S. Cl.
CPC ................ *B62D 33/0273* (2013.01)

(58) Field of Classification Search
CPC .............. B62D 33/027; B62D 33/0273; B62D 33/0276; B62D 33/03; E05D 15/16; E05D 15/165; E05D 15/20
See application file for complete search history.

(56) References Cited

U.S. PATENT DOCUMENTS

| 5,931,519 A * | 8/1999 | Jeffers ....................... B60P 3/36 280/901 |
| 6,749,246 B2 * | 6/2004 | Landwehr .......... B62D 33/0273 296/61 |

(Continued)

FOREIGN PATENT DOCUMENTS

WO  WO 2021/163788 A1 *  8/2021  ......... B62D 33/0273

OTHER PUBLICATIONS

International Search Report and Written Opinion for International Application No. PCT/CA2021/050167, dated Apr. 19, 2022.

*Primary Examiner* — Gregory A Blankenship
(74) *Attorney, Agent, or Firm* — Borden Ladner Gervais LLP; Brandon L. Evenson

(57) ABSTRACT

A vehicle tailgate with an integrated collapsible door comprises a tailgate having an outer wall, an inner wall and a cavity there between, a door section located in an upper portion of the tailgate having an inboard wall and an outboard wall and being moveable between a closed position and an open position substantially within an envelope of the tailgate, the door section comprising means to vary the spacing between the inboard wall and the outboard wall, the means to vary the spacing between the inboard wall and the outboard wall comprising at least one rotatable cam element located within the door section, such that when the door section is in the closed position the inboard wall is flush with the inner wall and the outboard wall is flush with the outer wall and when the door section is in the open position the spacing between the inboard wall and the outboard wall is reduced to allow a portion of the door section to be received in the cavity.

4 Claims, 11 Drawing Sheets

(56) References Cited

U.S. PATENT DOCUMENTS

| | | | | |
|---|---|---|---|---|
| 8,348,325 B2* | 1/2013 | Hausler | ............ | B62D 33/0273 |
| | | | | 296/62 |
| 9,463,746 B2 | 10/2016 | Butlin, Jr. et al. | | |
| 9,988,103 B1* | 6/2018 | Mouch | ............... | B62D 33/0273 |
| 11,208,157 B2* | 12/2021 | Borkar | ................ | B62D 33/037 |
| 2017/0313365 A1* | 11/2017 | Camp | ................ | B62D 33/037 |
| 2021/0221448 A1* | 7/2021 | Hung | ................ | B62D 33/0273 |
| 2021/0403097 A1* | 12/2021 | Gase | .................... | E05F 15/605 |
| 2022/0024525 A1* | 1/2022 | Staser | ................ | B62D 33/0276 |
| 2022/0297770 A1* | 9/2022 | Cunningham | ..... | B62D 33/0273 |
| 2022/0355737 A1* | 11/2022 | Nania | ....................... | B60R 3/02 |
| 2022/0371667 A1* | 11/2022 | Hemphill | ........... | B62D 33/0276 |

* cited by examiner

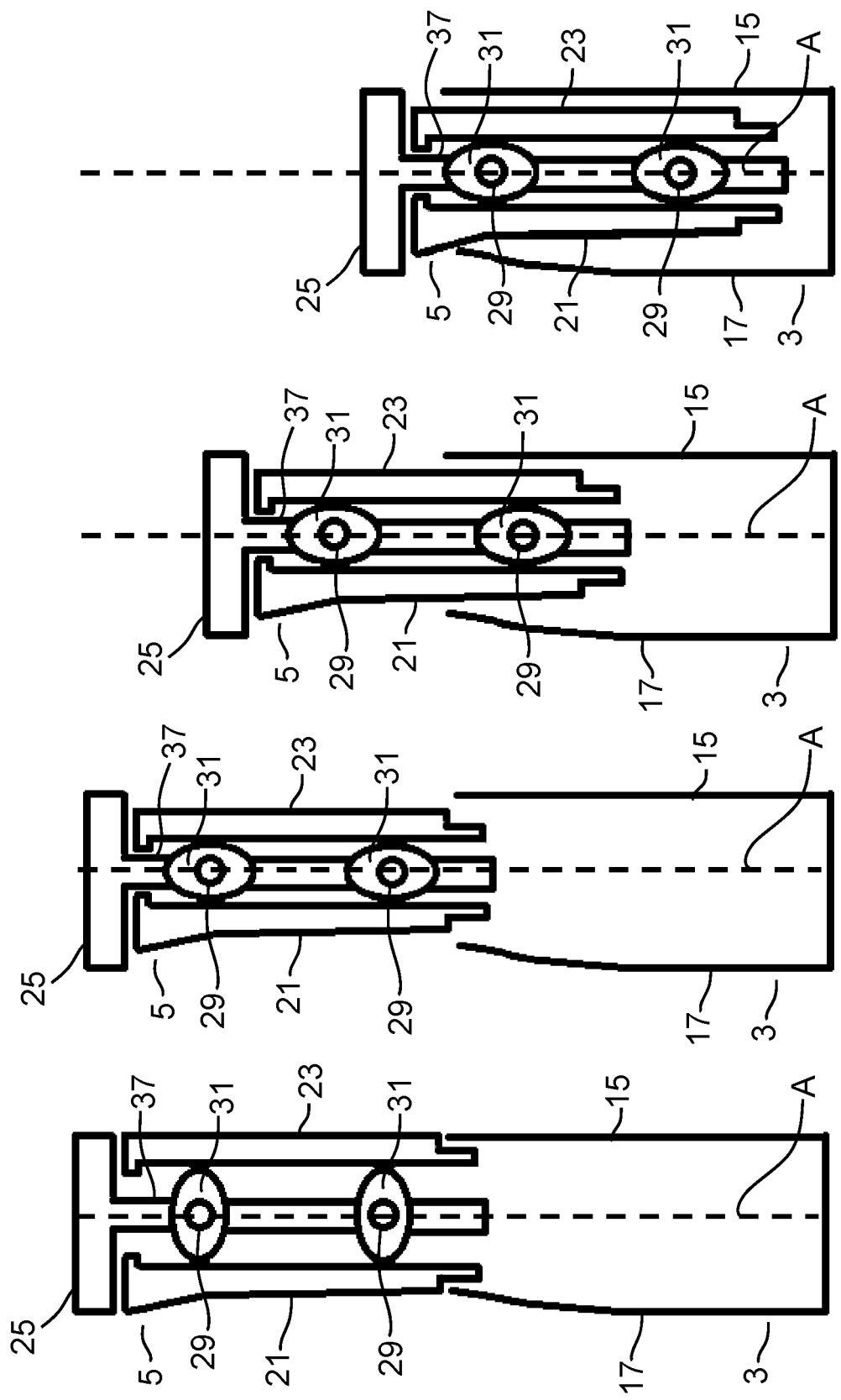

TAILGATE FOR VEHICLE WITH INTEGRATED COLLAPSIBLE DOOR

BACKGROUND

There are various situations in which an opening or door in a pick-up truck tailgate is useful. For example, a tailgate door may provide better access to the cargo area and truck bed or provide a means for enhanced cargo loading, such as flexibility in hauling long loads. In addition, a door within a tailgate may be useful when hooking up and hauling a fifth wheel trailer. An opening, usually in the central, upper portion of the tailgate, permits the boom of a fifth wheel trailer to extend into the area of the truck bed to mate with a hitch mounted to the truck bed. Such a tailgate opening or door may also be useful with the tailgate lowered to horizontal to allow access to a trailer hitch which extends upwards from below the truck bed. Other benefits will be apparent to those who use pick-up trucks.

Various solutions have been proposed to solve this problem. For example, U.S. Pat. No. 9,988,103 discloses a central section of the tailgate which can be removed, hinged horizontally or slid horizontally either to be received into a pocket in the tailgate or to nest over a portion of the tailgate body. Removal is inconvenient and may result in loss of the central section, or damage to it when separated from the tailgate. Hinging is effective, but either reduces the capacity of the truck bed when the hinging is inboard, or limits access to the rear of the truck bed when the hinging is outboard. It is apparent that in the latter sliding embodiments, the external dimensions of the central section must be either less than the dimensions of the tailgate body into which the central section slides, or greater than the dimensions of the tailgate body over which the central section nests or overlies. This necessarily results in discontinuities of the external surface of the tailgate when the central section is in its closed, or home, position. For a variety of reasons, including cleanliness and prevention of snags, this solution presents potential problems.

Accordingly, it would be beneficial to have an integrated tailgate door, preferentially as a central section, which could be received into the body of the tailgate when required, yet would present a smooth, essentially continuous, tailgate contour when in its closed, or home, position.

SUMMARY OF THE INVENTION

A vehicle tailgate with integrated collapsible door which overcomes the problems with various prior art solutions is disclosed in the following description and drawings.

In a principal aspect of the invention, the vehicle tailgate with an integrated collapsible door comprises a tailgate having an outer wall, an inner wall and a cavity there between, a door section located in an upper portion of the tailgate having an inboard wall and an outboard wall and being moveable between a closed position and an open position substantially within an envelope of the tailgate, the door section comprising means to vary the spacing between the inboard wall and the outboard wall, the means to vary the spacing between the inboard wall and the outboard wall comprising at least one rotatable cam element located within the door section, such that when the door section is in the closed position the inboard wall is flush with the inner wall and the outboard wall is flush with the outer wall and when the door section is in the open position the spacing between the inboard wall and the outboard wall is reduced to allow a portion of the door section to be received in the cavity.

In a further aspect of the invention, the at least one rotatable cam element is mounted to a rod which is rotatable to vary the orientation of the at least one rotatable cam element within the door section.

In a further aspect of the invention, the at least one rotatable cam element comprises a plurality of cam elements and the at least one rod comprises a plurality of rods.

In a further aspect of the invention, the rod is received in a track mounted to the tailgate body and the rod moves along the track in either permitted direction to move the door section from its closed position to its open position.

BRIEF DESCRIPTION OF THE DRAWINGS

FIG. 21 is a schematic, cut-away, side, cross-sectional, elevation view of a tailgate with door section in the closed position.

FIG. 22 is a schematic, cut-away, side, cross-sectional elevation view of a tailgate with door section in a first partially open position.

FIG. 23 is a schematic, cut-away, side, cross-sectional elevation view of a tailgate with door section in a second partially open position.

FIG. 24 is a schematic, cut-away, side, cross-sectional elevation view of a tailgate with door section in an open position.

DETAILED DESCRIPTION OF THE INVENTION

Figure 1:
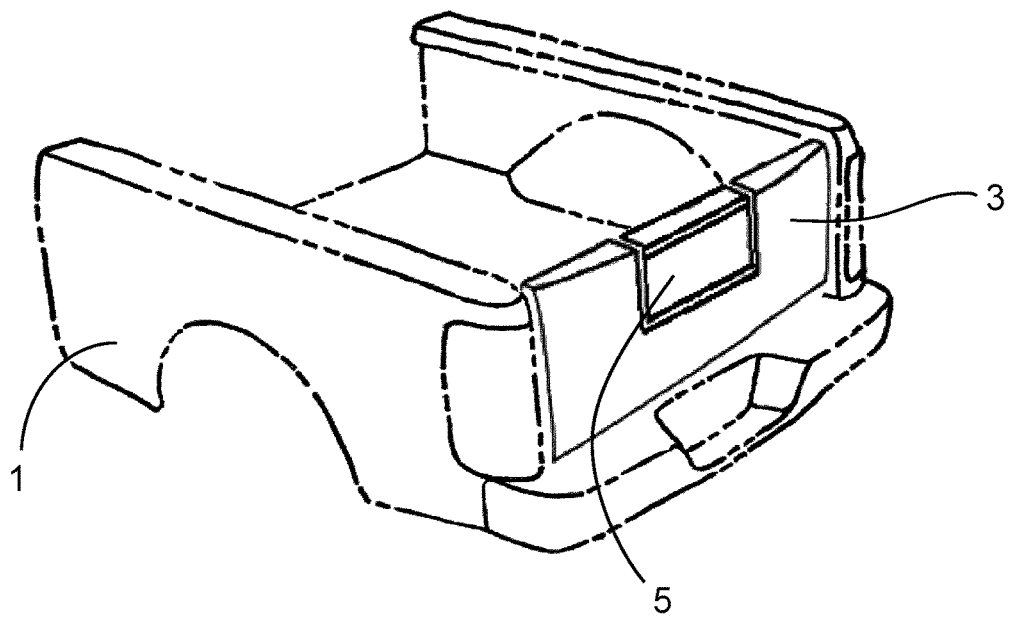
FIG. 1 is a partial perspective view of a vehicle with a tailgate and a tailgate door section.
Figure 2:
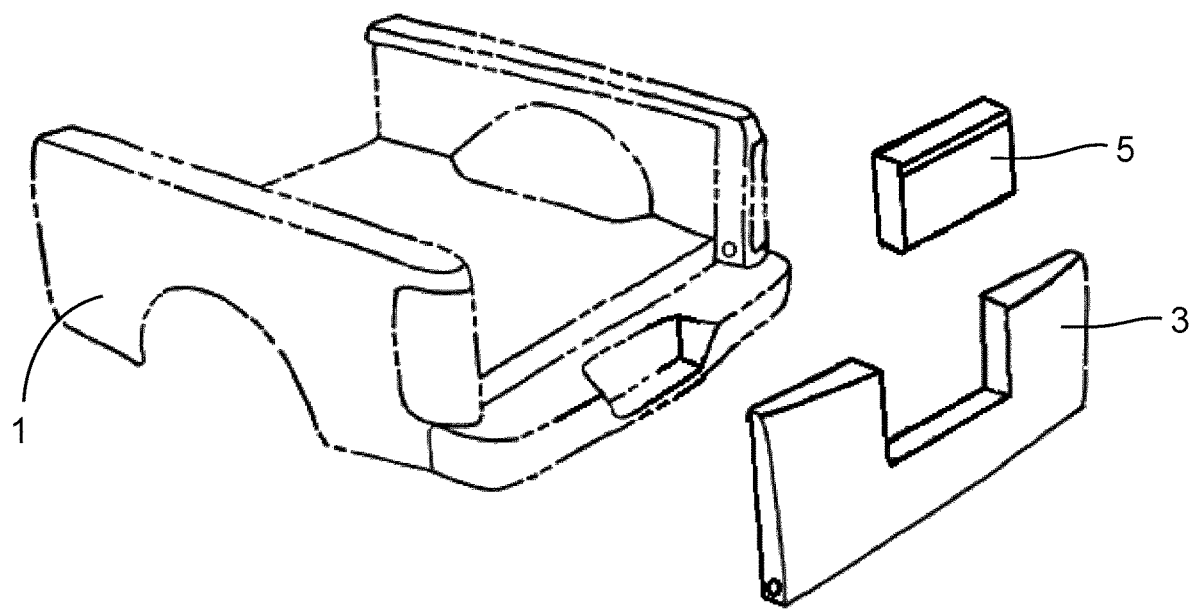
FIG. 2 is a partial exploded perspective view of a vehicle with a tailgate and a tailgate door section.

A vehicle 1, typically a pick-up truck, is fitted with a vehicle tailgate 3. The tailgate 3 also comprises a door section 5. In FIG. 1, the tailgate is illustrated with the door in the normal closed position. An exploded view of these components is illustrated in FIG. 2.

Figure 3:
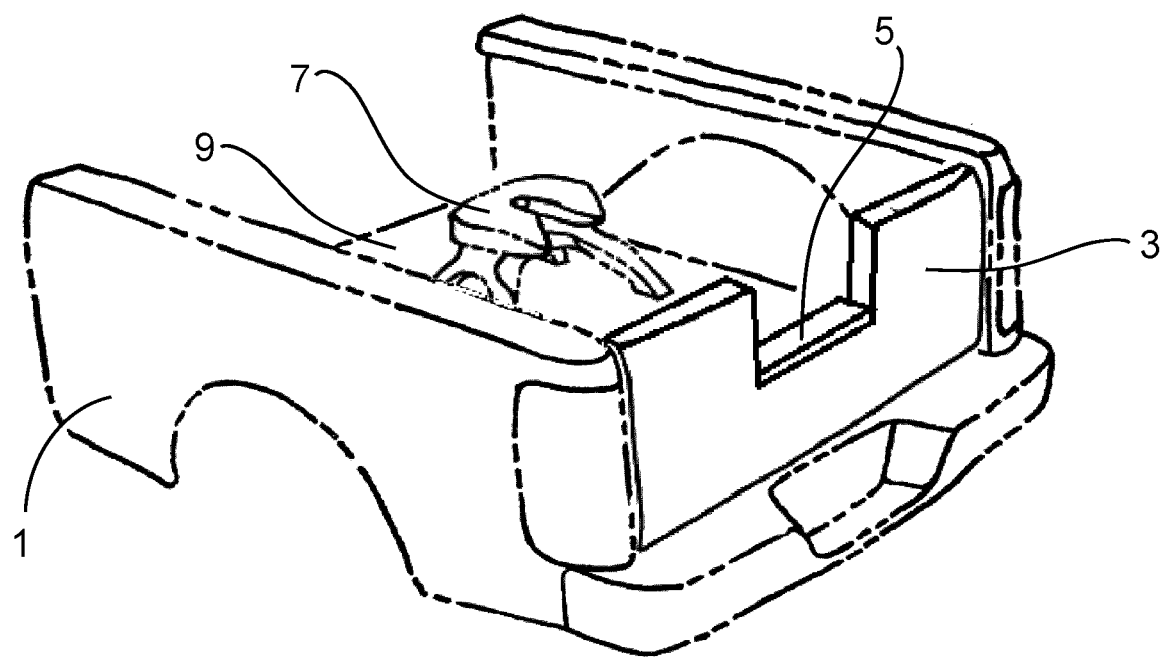
FIG. 3 is a partial perspective view of a vehicle with an open door in a closed tailgate and a fifth wheel trailer hitch.
Figure 4:
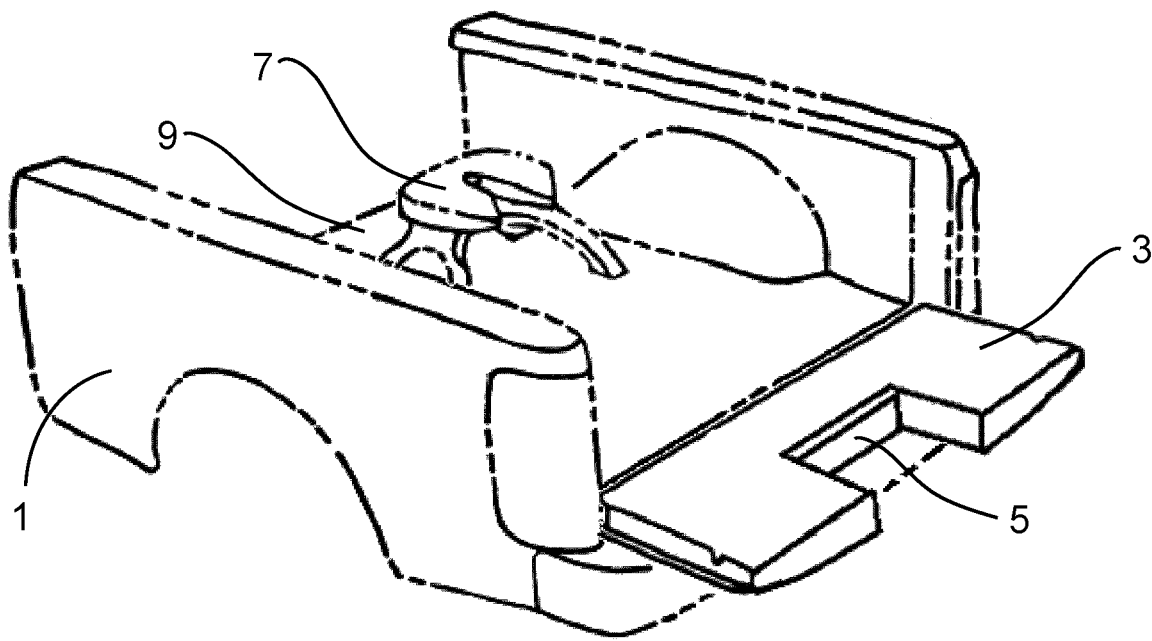
FIG. 4 is a partial perspective view of a vehicle with an open door in an open tailgate and a fifth wheel trailer hitch.
Figure 7:
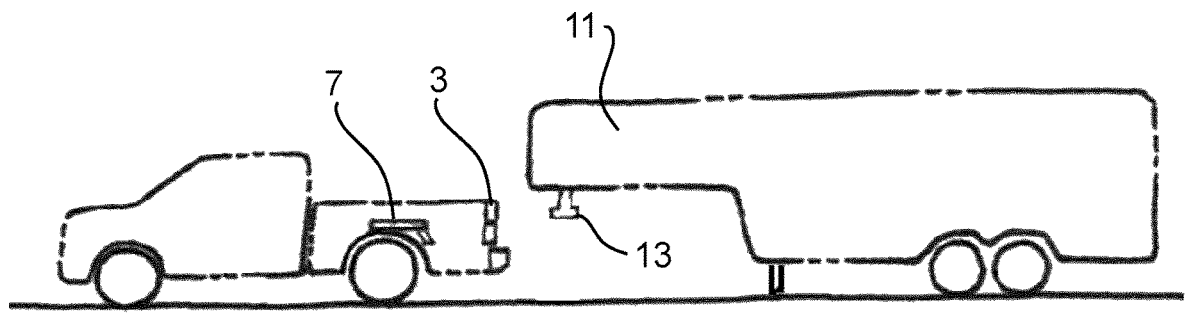
FIG. 7 is an elevation view of a vehicle with a fifth wheel trailer hitch and unattached trailer.
Figure 8:
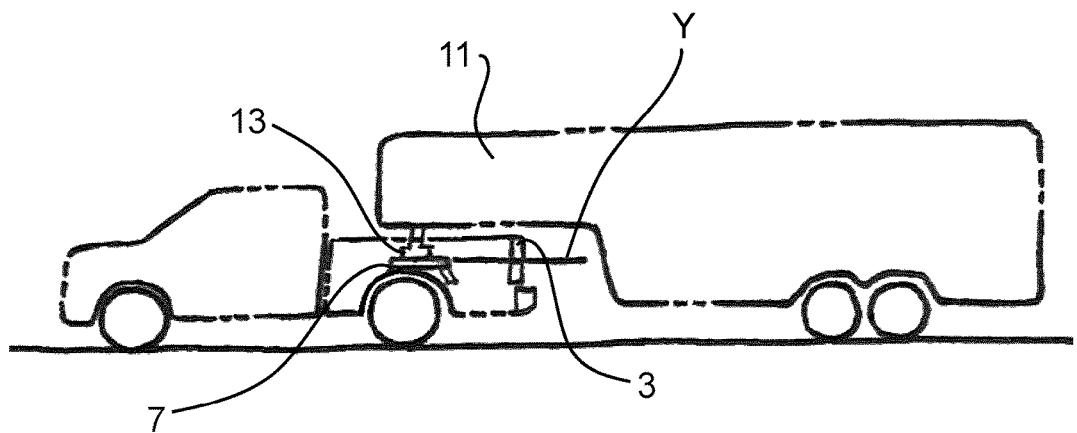
FIG. 8 is an elevation view of a vehicle with a fifth wheel trailer hitch and attached trailer.

FIG. 3 illustrates a fifth wheel trailer hitch 7 mounted to a bed 9 of the cargo area of the vehicle 1. In FIG. 3, the vehicle tailgate 3 is in the normal closed position but with the integral door section 5 retracted within the envelope of the tailgate 3, which may be called an open position of the door section 5. In FIG. 4, the tailgate 3 is open to the horizontal position, still with the door section 5 retracted within the tailgate 3. FIG. 7 and FIG. 8 illustrate a trailer 11 with a gooseneck connector 13 adapted for connection to fifth wheel trailer hitch 7. As illustrated in FIG. 8, with the door section 5 retracted, the gooseneck 13 may move along line Y though the open area in the tailgate 3 created by the retracted door section 5 to engage with fifth wheel trailer hitch 7.

Figure 5:
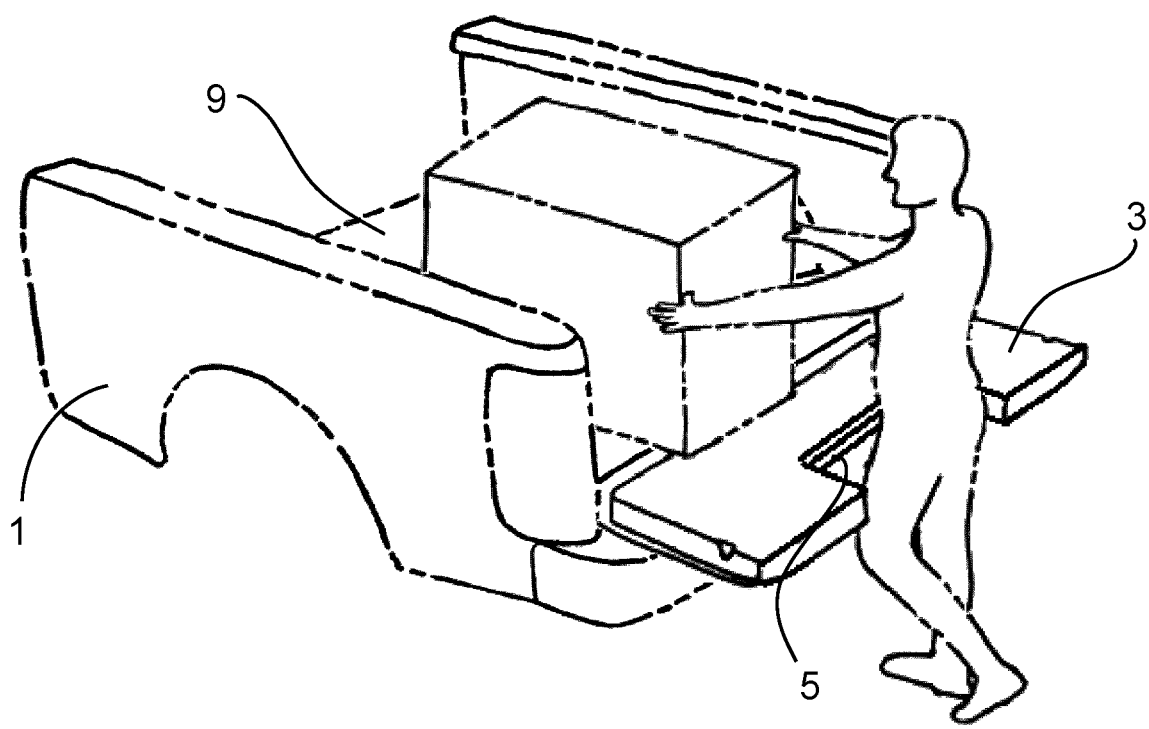
FIG. 5 is a partial perspective view of a vehicle with an open door section in an open tailgate and cargo.
Figure 6:
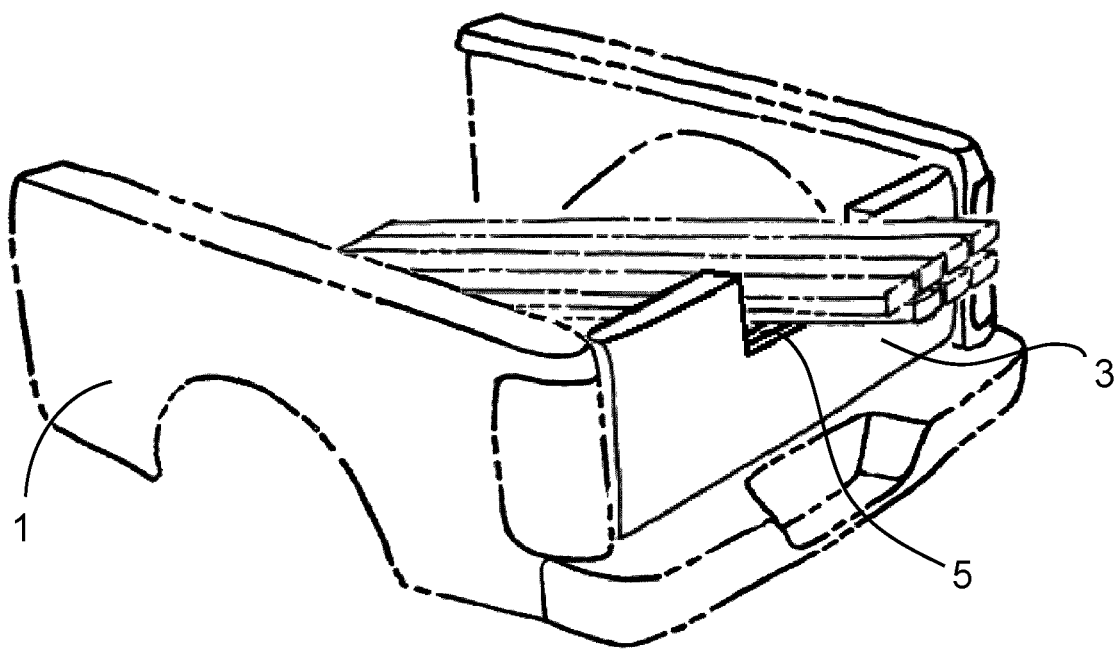
FIG. 6 is a partial perspective view of a vehicle with an open door section in a closed tailgate and cargo.

The integrated retractable door section 5 is useful in a variety of situations apart from those involving a fifth wheel trailer hitch. For example, when the tailgate 3 is in the horizontal open position with the door section 5 retracted, as illustrated in FIG. 5, a user may approach closer to the truck bed to deal with cargo. When the tailgate 3 is in the closed position with the door section 5 retracted, as illustrated in FIG. 6, long cargo carried in the cargo area may extend rearwardly from the vehicle through the open door section, yet be constrained from lateral movement by the tailgate.

Figure 9:
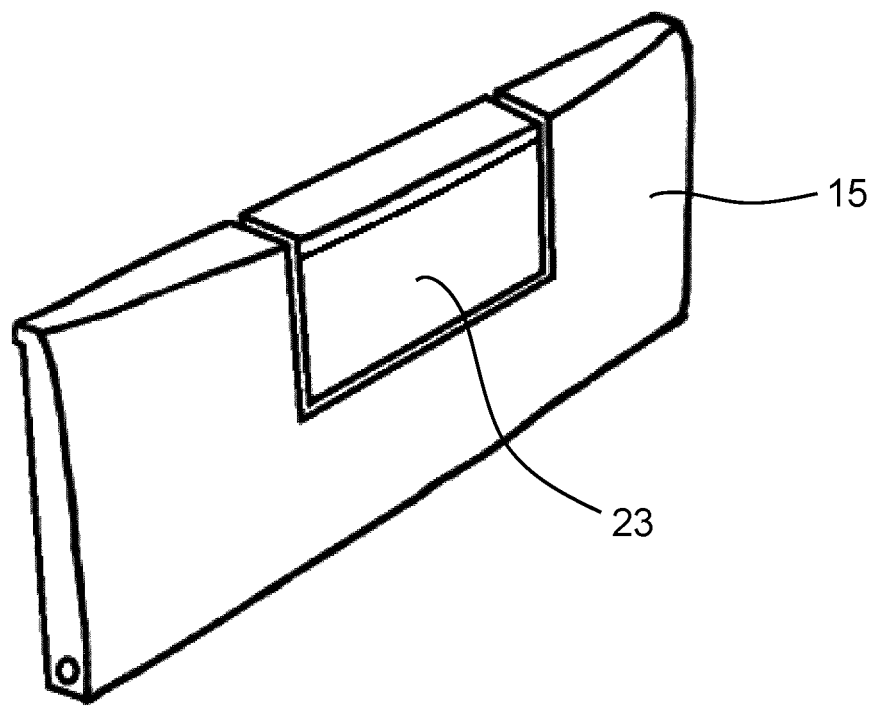
FIG. 9 is a perspective outboard view of a vehicle tailgate with closed door section.
Figure 10:
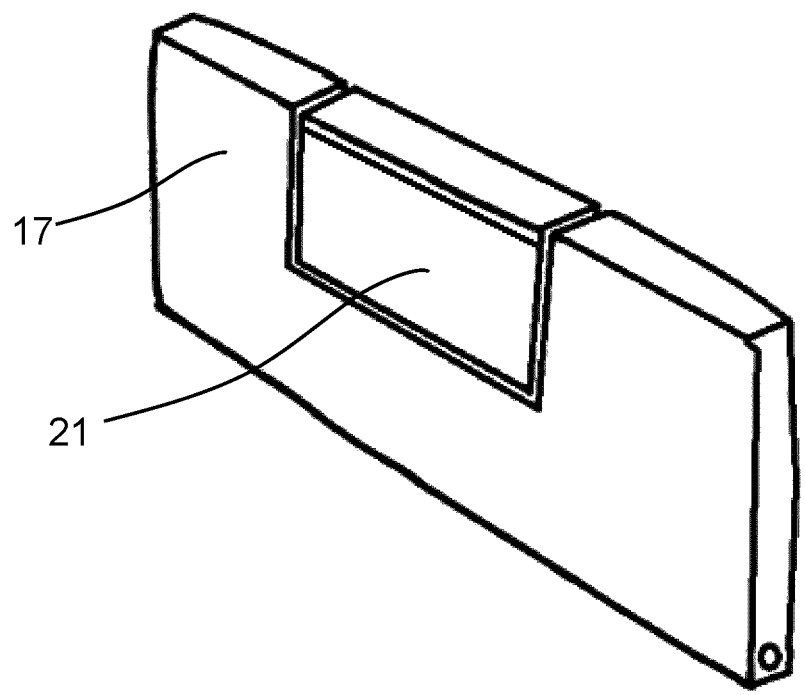
FIG. 10 is a perspective inboard view of a vehicle tailgate with closed door section.

As illustrated in FIGS. 9 and 10, the tailgate 3, typically formed from sheet metal or plastic, or a combination of such materials, comprises an outer wall 15 and an inner wall 17. A fixed spatial relationship is maintained between these outer and inner tailgate walls 15, 17. At least in the area below the door section 5 in the normal door closed position, there is a cavity 19 between the inner wall 17 and the outer wall 15 of the tailgate 3. The cavity 19 is configured to accept the door section 5 when it is opened and retracted into the cavity 19. The door section 5 may be retracted partially or essentially fully into the cavity 19.

The door section 5 comprises an inboard wall 21 and an outboard wall 23. In contrast to the walls of the tailgate 3, the walls of the door section 5 are configured to move in relation to each other. The term wall as used herein in relation to either to tailgate 3 or door section 5 is not intended to indicate a strict two-dimensional or sheet structure. The various walls may have depth and more complex structures as illustrated in the accompanying drawings. When the door section 5 is in the normal closed position, the inboard wall 21 of the door section 5 is essentially flush with the inner wall 17 of the tailgate 3. Similarly, when the door section 5 is in the normal closed position, the outboard wall 23 of the door section 5 is essentially flush with the outer wall 15 of the tailgate 3. This condition mimics a unitary tailgate without a door and is aesthetically pleasing as well as beneficial for maintaining vehicle cleanliness, safety, etc.

Figure 11:
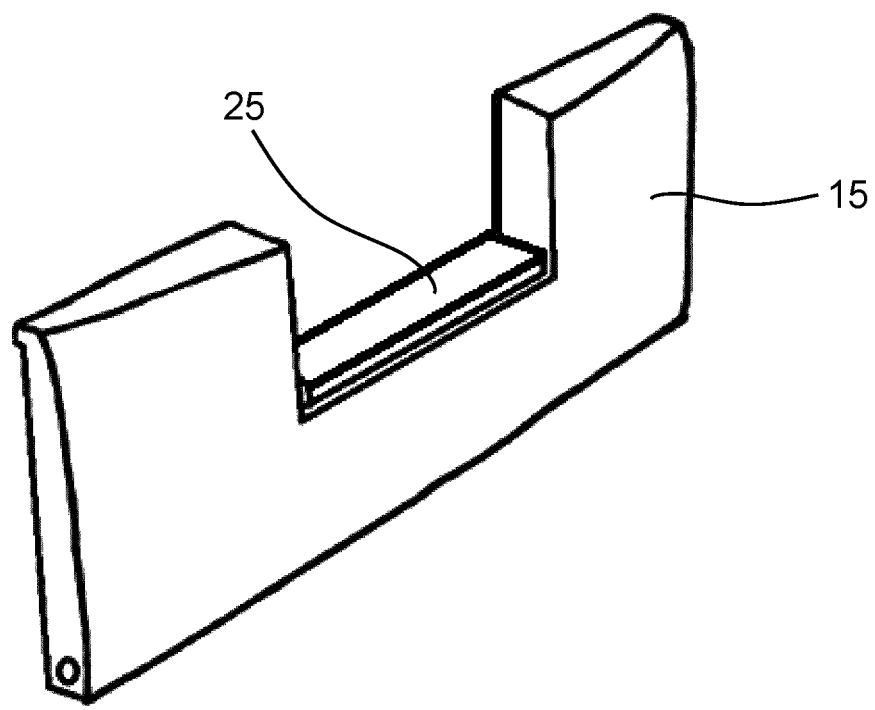
FIG. 11 is a perspective outboard view of a vehicle tailgate with open door section.
Figure 12:
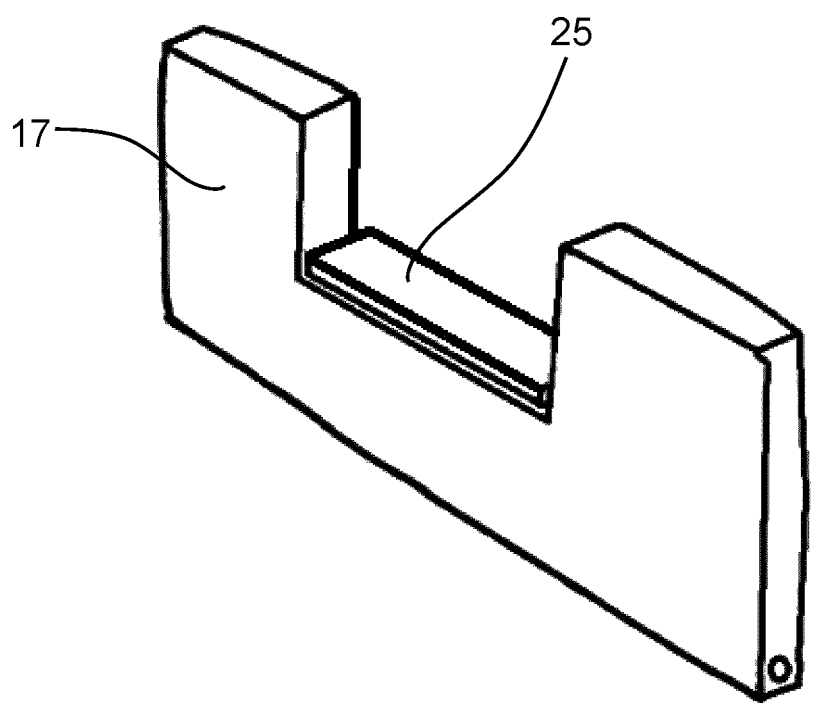
FIG. 12 is a perspective inboard view of a vehicle tailgate with open door section.

FIG. 11 and FIG. 12 illustrate the vehicle tailgate 3 with the door section 5 in the retracted, or open, position. Viewed from outboard the vehicle in FIG. 11 and from inboard the vehicle in FIG. 12, the door section 5 is essentially fully retracted into the cavity 19. The door section 5 is fitted with a cap 25 which provides a suitable upper surface of the door section whether the door section is open or closed. Since the inboard wall 21 and the outboard wall 23 of the door section 5 move in relation to each other when the door section is retracted and extended, the cap 25 may be connected to one of the outboard wall 23 and inboard wall 21. The cap 25 is retracted and extended along with the door section 5. Alternatively, as illustrated in FIGS. 21 to 24, the cap may be formed in a T-shape, at least as viewed in cross-section adjacent its lateral ends. Downwardly extending arms 37 integral with or attached to cap 25 are mounted to laterally extending rods 29 so that the cap may translate upwardly and downwardly along with the inboard and outboard walls 21, 23 without being connected to either of said walls. The function of the rods 29 is further explained below.

Figure 13:
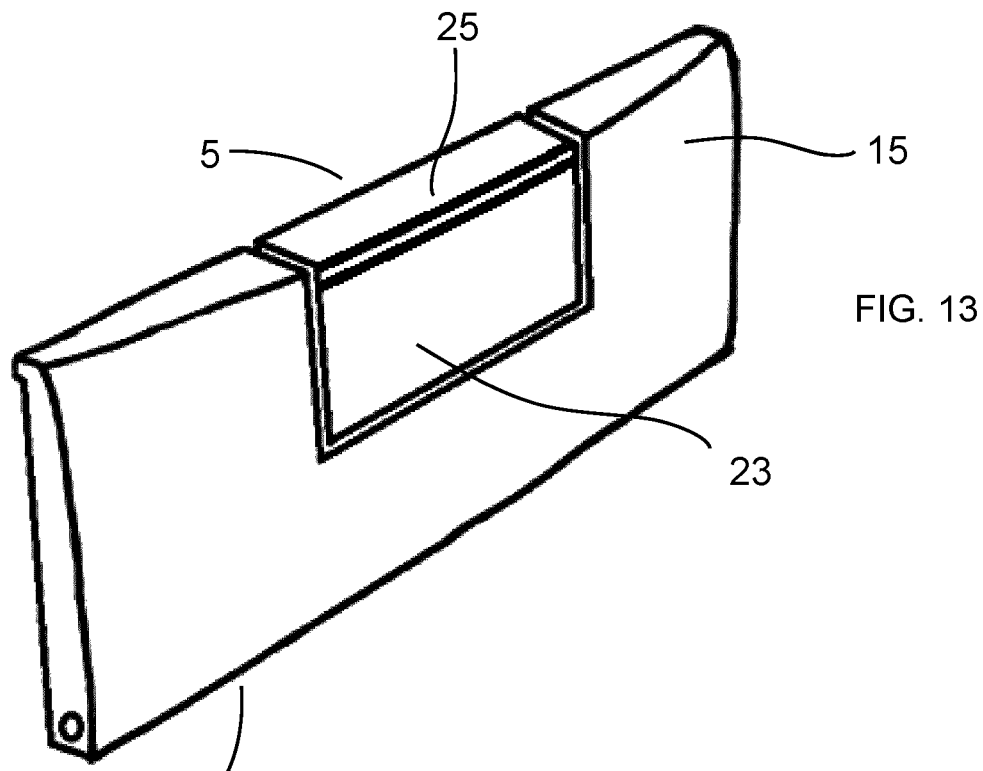
FIG. 13 is a perspective outboard view of a vehicle tailgate with closed door section.
Figure 14:
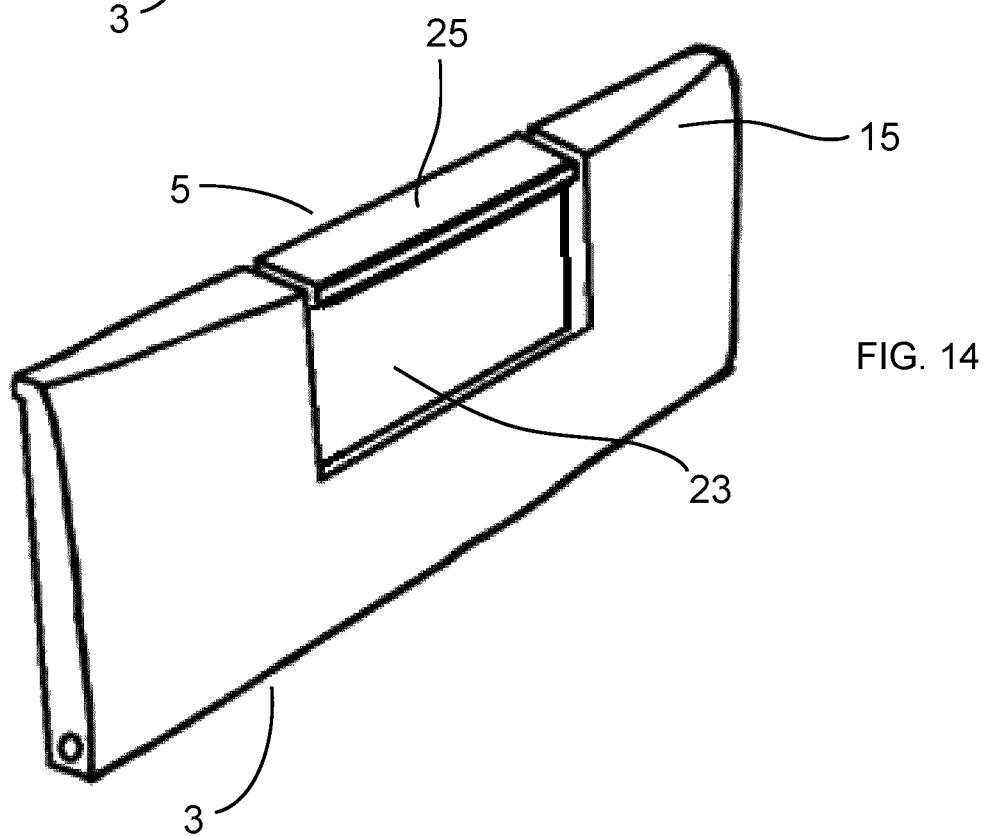
FIG. 14 is a perspective outboard view of a vehicle tailgate with closed door section with the walls of the door section drawings towards each other prior to opening of the door section.
Figure 15:
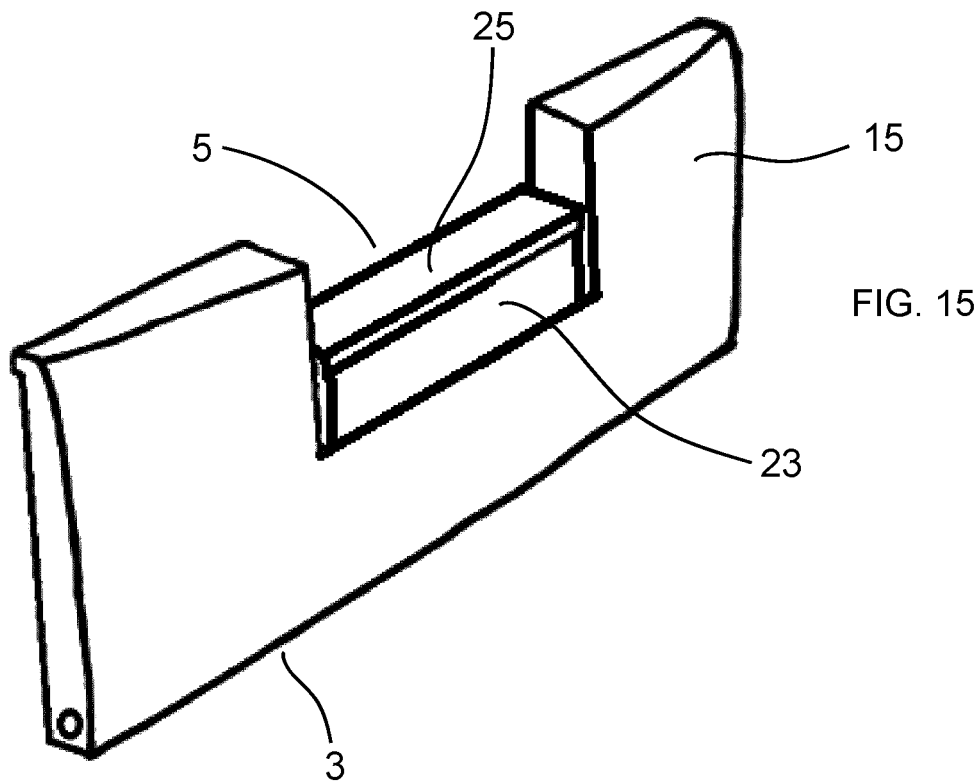
FIG. 15 is a perspective outboard view of a vehicle tailgate with partially open door section.
Figure 16:
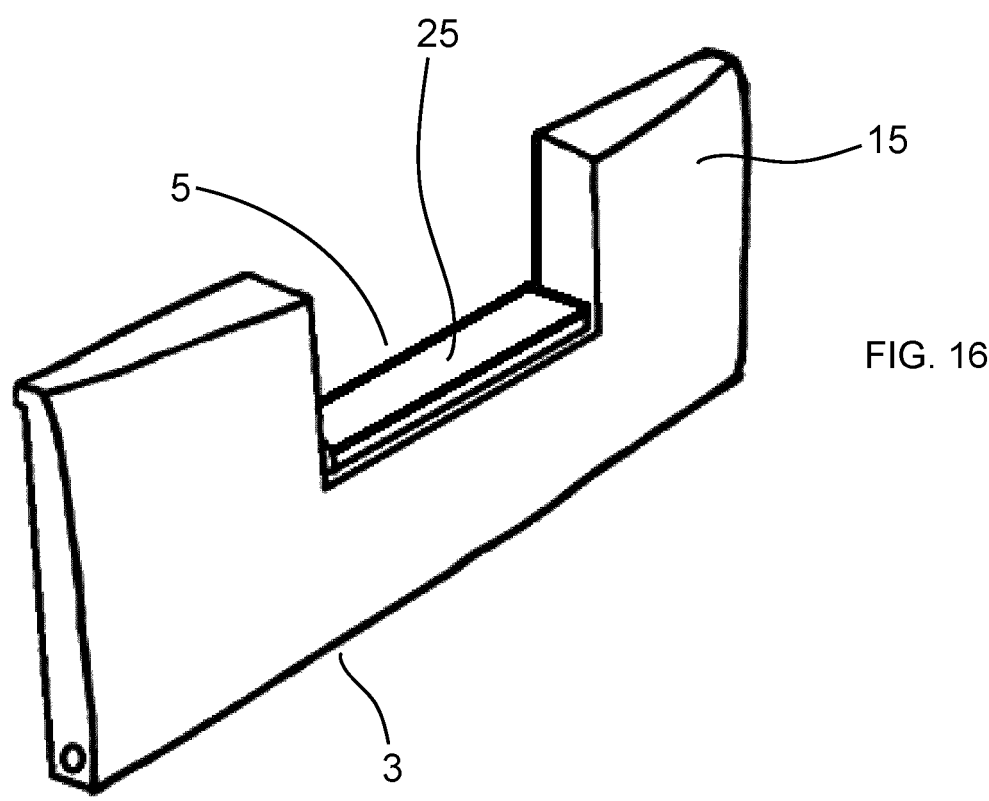
FIG. 16 is a perspective outboard view of a vehicle tailgate with open door section.

FIGS. 13 to 16 illustrate the door section 5, viewed from outboard the vehicle 1, moving from the normal closed position to the fully retracted position. In FIG. 13, with the door section 5 in the normal closed position, outboard wall 23 is exposed and flush with outer wall 15 of tailgate 3. In FIG. 14, door section 5 is partially retracted into cavity 19. Outboard wall 23 now lies within the envelope of the tailgate inner and outer walls 15, 17 to be accommodated within the cavity 19. In FIG. 15, door section 5 is fully retracted into cavity 19. As illustrated in FIGS. 13 to 16, cap 25 is connected to outboard wall 23 of door section 5. Although FIGS. 13 to 16 illustrate the vehicle tailgate and door section from the outboard perspective, the inboard wall 21 also moves from being flush with the inner wall 17 to lie within the envelope of inner wall 17 when the door section 5 is in the open or retracted position.

The door section 5 is retracted into the cavity 19 of the tailgate 3, and extended in the reverse direction, using mechanical force. A hand operated mechanism may initiate movement of the inboard wall 21 and the outboard wall 23 towards each other and the door section 5 into the cavity 19. Alternatively, a power source such as an electrical power drive unit may perform these functions.

Figure 17:
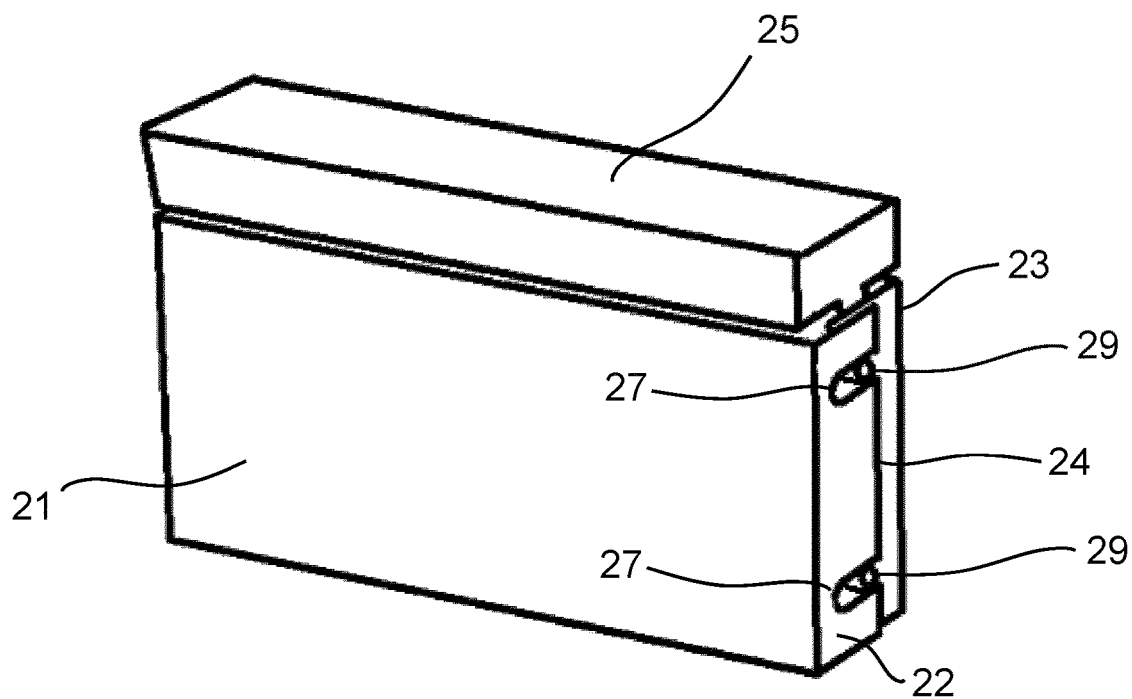
FIG. 17 is a perspective inboard view of a tailgate door section.
Figure 18:
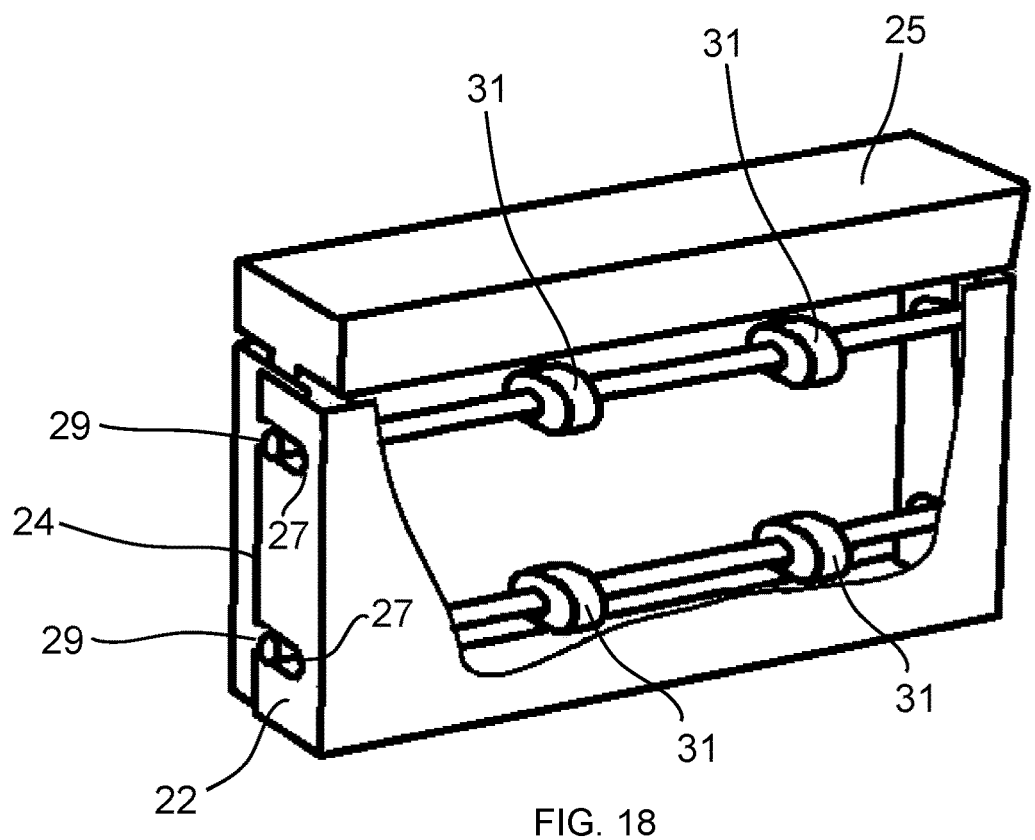
FIG. 18 is a perspective partially cut-away inboard view of a tailgate door section.

As illustrated in FIGS. 17 and 18, the inboard wall 21 of the door section 5 is provided with inboard end walls 22 at right angles to the inboard wall 21. Similarly, the outboard wall 23 is provided with outboard end walls 24 at right angles to the outboard wall 23. At each end of the inboard and outboard walls 21, 23, the inboard and outboard end walls 22, 24 overlap to allow them to slide adjacent to each other. Each of the inboard and outboard end walls 22, 24 is provided with horizontal aligned slots 27. Stretching laterally across the door section is at least one rod 29 which extends at each end thereof through aligned slots 27 in each of the inboard and outboard end walls 22, 24. This construction permits the inboard and outboard walls 21, 23 to move towards each other in overlapping fashion at the respective end walls 22, 24 as the ends of the rod 29 ride within the corresponding aligned slots 27. Each rod 29 is provided with one or more cams 31. The rods 29 are rotated using the mechanical force previously described. The non-spherical shape of the cams 31 creates a variable permitted spacing between the inboard and outboard walls 21, 23. When the cams 31 on the rods 29 are rotated to their maximum width, the inboard and outboard walls 21, 23 are held apart as in the normal door section closed position. By contrast, when the cams 31 on the rods 29 are rotated to their minimum width, the inboard and outboard walls 21, 23 are permitted to more closely approach each other, to permit the door section 5 to be retracted into the cavity 19 in the door section open position.

Figure 19:
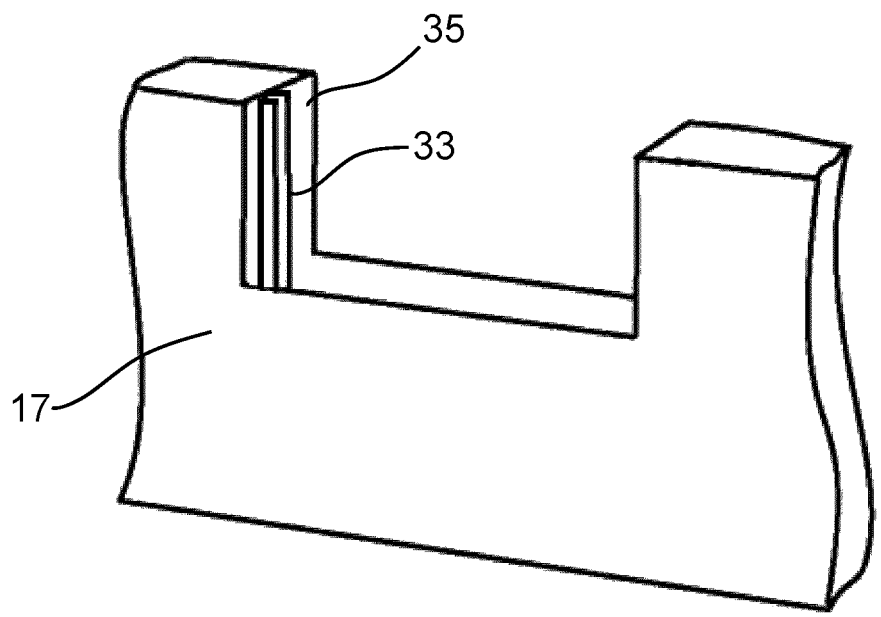
FIG. 19 is a partially cut-away perspective inboard view of a tailgate without door section.
Figure 20:
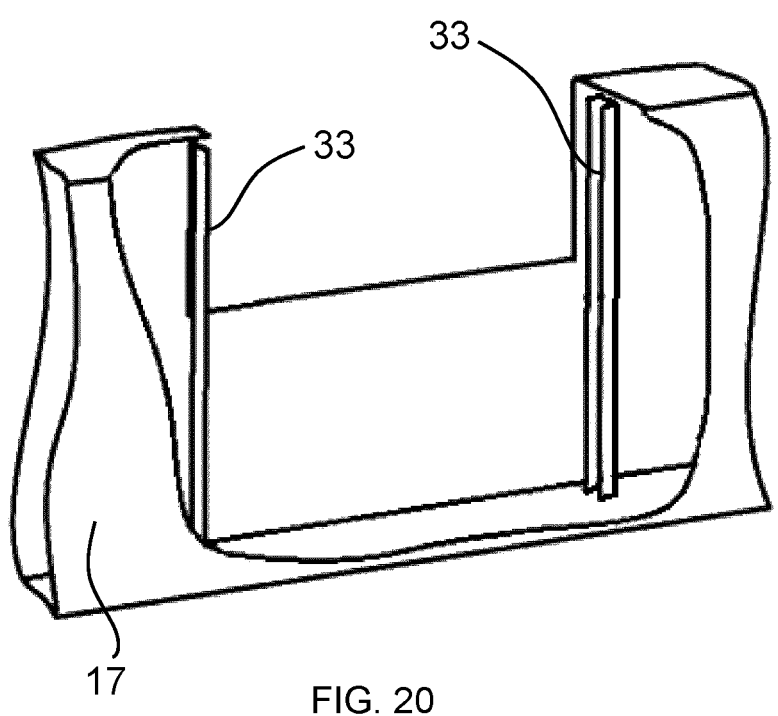
FIG. 20 is a partially cut-away, perspective view of a vehicle tailgate without door section.

FIGS. 19 and 20 illustrate a portion of tailgate 3, with the door section 5 removed. Tracks 33 are mounted vertically on door section facing surfaces 35 of the tailgate 3. Rods 29 ride in these tracks 33 when the door section 5 is retracted to the open position and extended to the closed position.

FIGS. 21 to 24 illustrate in cross-section one end of the door section 5 moving from the closed door section position to the open door section position. Preferably, both ends of the door section 5 function in this way although only one end is illustrated. In FIG. 21, the inboard and outboard walls 21, 23 of the door section 5 are essentially flush with the inner and outer walls 17, 15 of the tailgate 3. The downwardly extending arm 37 of the T-shaped end cap 25 is connected to the rods 29. The rods 29 may pass through apertures in the downwardly extending arm 37, or they may be connected in other suitable ways. The rods 29 ride in one of the tracks 33. The line of travel of the rods 29 in the track 33 is shown by broken line A.

To initiate the motion of the door section 5 from the closed position, rods 29 are rotated. The cams 31 mounted to the rods 29 are at their maximum width in the door section closed position. Rotation of the cams 31 decreases the effective diameter of the cams 31 in relation to the inboard and outboard walls 21, 23. This allows the inboard and outboard walls 21, 23 to draw closer together and to fit within the envelope of the inner and outer walls 17, 15 of the tailgate 3. The cams 31 rotate sufficiently to permit the desired separation between the inboard and outboard walls 21, 23. The mechanical action described above then continues until the door section 5 lies sufficiently within the cavity 19 of the tailgate 3 to place the door section 5 in its open position.

It should be understood that although particular component arrangements are disclosed in the illustrated embodiments, other arrangements will benefit from this invention. Although particular step sequences are shown and described, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that reason, the following claims should be studied to determine their true scope and content.

The invention claimed is:

1. A vehicle tailgate with an integrated collapsible door comprising:
   a tailgate having an outer wall, an inner wall and a cavity there between;
   a door section located in an upper portion of the tailgate having an inboard wall and an outboard wall and being moveable between a closed position and an open position substantially within an envelope of the tailgate;
   the door section comprising means to vary the spacing between the inboard wall and the outboard wall;
   the means to vary the spacing between the inboard wall and the outboard wall comprising at least one rotatable cam element located within the door section;
   such that when the door section is in the closed position the inboard wall is flush with the inner wall and the outboard wall is flush with the outer wall and when the door section is in the open position the spacing between the inboard wall and the outboard wall is reduced to allow a portion of the door section to be received in the cavity.

2. The vehicle tailgate with an integrated collapsible door of claim 1, wherein the at least one rotatable cam element is mounted to a rod which is rotatable to vary the orientation of the at least one rotatable cam element within the door section.

3. The vehicle tailgate with an integrated collapsible door of claim 2, wherein the at least one rotatable cam element comprises a plurality of cam elements and the at least one rod comprises a plurality of rods.

4. The vehicle tailgate with an integrated collapsible door of claim 3, wherein the at least one rod is received in a track mounted to a tailgate body and the rod moves along the track in either permitted direction to move the door section from its closed position to its open position.

\* \* \* \* \*